United States Patent [19]

Ramsay et al.

[11] 3,833,763

[45] Sept. 3, 1974

[54] PULSED OSCILLATOR FOR LOW LIGHT LEVEL TELEVISION SYSTEM

[75] Inventors: Melvin Murray Ramsay, Broxbourne; Anthony Ian McLennan, Harlow, both of England

[73] Assignee: International Standard Electric Corporation, New York, N.Y.

[22] Filed: Feb. 22, 1973

[21] Appl. No.: 334,820

[52] U.S. Cl. .......................... 178/7.2, 178/DIG. 11

[51] Int. Cl. .......................... H04n 5/38

[58] Field of Search .......................... 178/7.2, DIG. 11; 250/213 VT

[56] References Cited

UNITED STATES PATENTS

| | | | |
|---|---|---|---|
| 3,061,673 | 10/1962 | Fathauer et al. | 178/7.2 |
| 3,086,077 | 4/1963 | Mayer | 178/7.2 |
| 3,419,745 | 12/1968 | Wenzel | 178/7.2 |
| 3,585,293 | 6/1971 | Crowder | 178/7.2 |
| 3,752,903 | 8/1973 | Newman et al. | 178/DIG. 11 |

*Primary Examiner*—Robert L. Richardson
*Assistant Examiner*—Jin F. Ng
*Attorney, Agent, or Firm*—John T. O'Halloran; Menotti J. Lombardi, Jr.; Edward Goldberg

[57] ABSTRACT

A low light level television system employs an image intensifier tube coupled to a camera tube. An oscillator supplying a high voltage multiplier for the image intensifier is triggered by a pulse that occurs before the vertical blanking pulse of the camera tube. This avoids video interference from the R.F. power supply. The shorter vertical blanking period occurs during the oscillator conducting period. The timing circuit includes a crystal oscillator and monostable voltage dividers which supply a clock pulse to the drive circuitry for the voltage supply oscillator.

4 Claims, 7 Drawing Figures

Fig. 4.

PATENTED SEP 3 1974

3,833,763

SHEET 1 OF 3

PULSED OSCILLATOR FOR LOW LIGHT LEVEL TELEVISION SYSTEM

BACKGROUND OF THE INVENTION

1. Field of the Invention

This invention relates to low light level television systems of the type having the optical output of an image intensifier coupled to the optical input of a television camera tube. In particular it relates to those types of system in which the voltage required to operate the image intensifier is derived from the output of a rectifying voltage multiplier supplied from an oscillator, and in which the television camera is provided with a positive interlace.

2. Description of the Prior Art

A known system employing an image intensifier tube coupled to a television camera tube for use with low light levels is described in copending application Ser. No. 303,554 filed Nov. 3, 1972 and assigned to the same assignee as the instant application.

Normally, in such systems, a rectifying voltage multiplier would be powered by a continuous wave oscillator, but a free running continuous wave oscillator is liable to produce interference on the video signal output. A solution to this problem of interference is provided by arranging to power the oscillator only during the vertical blanking periods. In many instances however the oscillator used for powering the rectifying voltage multipler has a turn-on period comparable with the duration of the vertical blanking pulse. If such an oscillator is turned on by the vertical blanking pulse it is only able to supply power for a small proportion of the vertical blanking period. One solution to such a problem is to redesign the oscillator to shorten its turn-on period. This would present other complications however.

SUMMARY OF THE INVENTION

It is therefore the object of the present invention to provide an improved circuit which avoids video interference from the R.F. power supply. This is incorporated in a low light level television system including a television camera with positive interlace coupled so as to derive its optical input from the optical output of an image intensifier which intensifier is powered via a rectifying voltage multiplier from the output of an oscillator. The oscillator is fed from a pulsed power supply triggered from the camera by circuitry which produces an oscillator triggering pulse edge in advance of the pulse edge employed for vertical blanking.

There follows a description of the circuitry employed to trigger the oscillator powering the rectifying voltage multiplier of a low light level television system embodying the invention in a preferred form.

DESCRIPTION OF THE PREFERRED EMBODIMENT

Figures 1, 4:
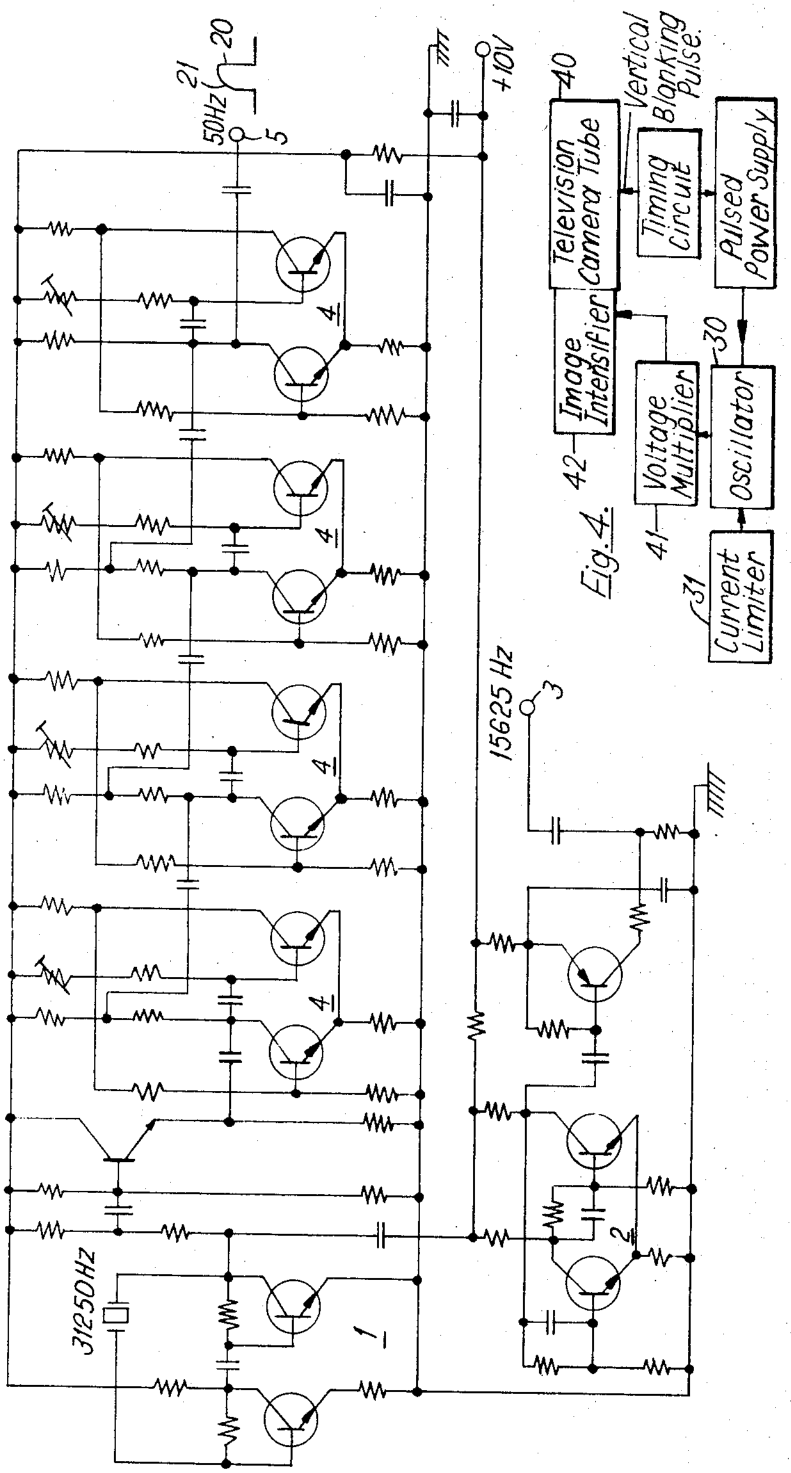
FIG. 1 depicts the timing circuitry of the television camera.
FIG. 4 shows a schematic block diagram of the system.
Figure 2A:
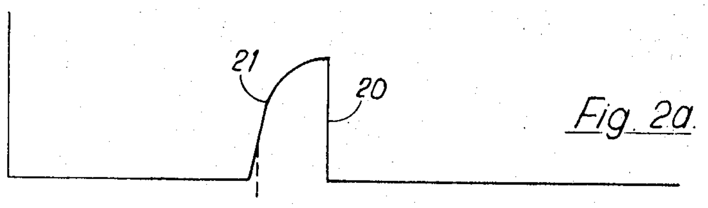
FIG. 2*a* depicts the 50 Hz clock waveform.

FIG. 1 depicts the timing circuitry of a television camera with positive interlace. A crystal oscillator designed to oscillate at 31,250 Hz is indicated at 1. The output of this oscillator is divided by two by a monostable dividing circuit 2 to provide a line frequency signal of 15,625 Hz at 3. The output of the oscillator is also divided four times over by five by the action of four monostable dividing circuits 4 connected together in cascade to provide a 50 Hz clock output at 5. The output at 5 has the general shape depicted in FIG. 2*a* in which pulse edges 20 represent the driving of the final monostable of the cascade into its quasistable state and pulse edge 21 represents its reversion to its stable state. Pulse edges 20 are used in circuitry (not illustrated) for vertical blanking of a television camera tube 40 shown in the system block diagram of FIG. 4.

Figure 3:
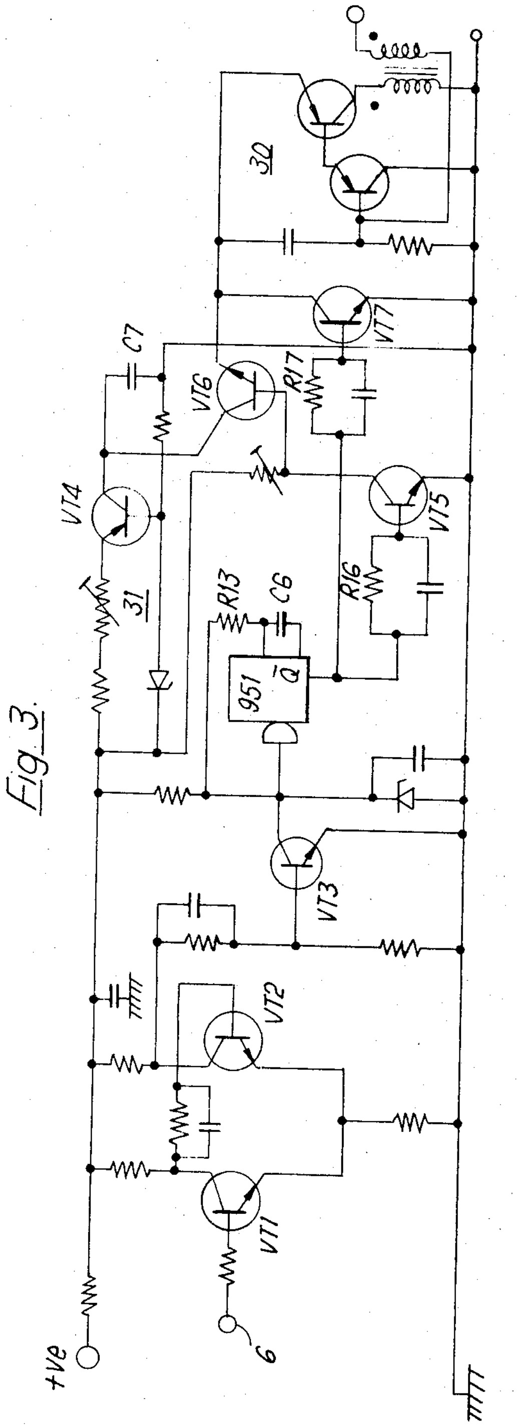
FIG. 3 is a circuit diagram of the oscillator and associated drive circuitry.

FIG. 3 depicts the oscillator that powers the rectifying voltage multiplier, block 41 of FIG. 4, and the associated oscillator drive circuitry and pulsed power supply. The oscillator, indicated generally at 30, is powered via a current limiting circuit indicated generally at 31. The current limiting circuit provides a form of automatic brightness control for the operation of the image intensifier 42 of FIG. 4 which is supplied from the oscillator via the rectifying voltage multiplier.

Figure 2B:
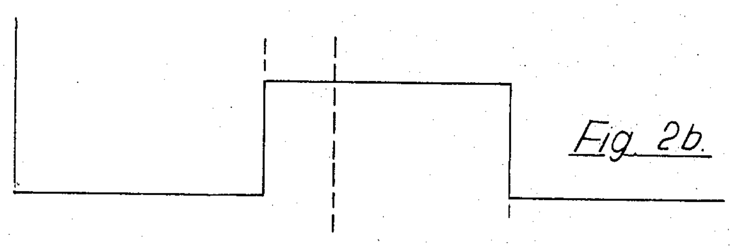
FIG. 2*b* depicts the power input waveform to the oscillator that powers the rectifying voltage multiplier.
Figure 2C:
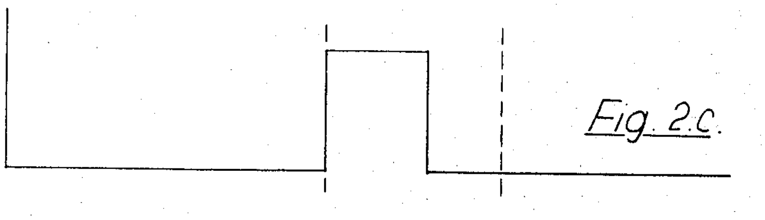
FIG. 2*c* depicts the vertical blanking pulse waveform.

The 50 Hz clock output from the circuitry of FIG. 1 is applied to terminal 6 of the circuitry illustrated in FIG. 3 where it is fed to a Schmitt trigger, VT1 and VT2, adjusted to fire at an appropriate point on the pulse edge 21. When the Schmitt trigger fires, VT1 conducts, and VT2 turns off allowing the collector voltage of VT2 to rise. This rise of voltage turns VT3 on, which saturates and thus triggers the 951 monostable multivibrator by taking its input to ground potential. The time constant of the 951 monostable is controlled by the values of R13 and C6 which are adjusted to provide the pulse waveform depicted in FIG. 2*b* (c. 3 msec). The monostable pulse is made long enough to bracket the whole of the vertical blanking pulse. In some instances the oscillator is incapable of supplying enough power during the vertical blanking period to meet the demand of the image intensifier, and so the duty cycle has to be increased by extending the width of the monostable pulse output so that it terminates a short time after the end of the vertical blanking pulse. Any resulting oscillator interference superimposed on the video signal output will in these circumstances be confined to the first few lines.

Figure 2D:
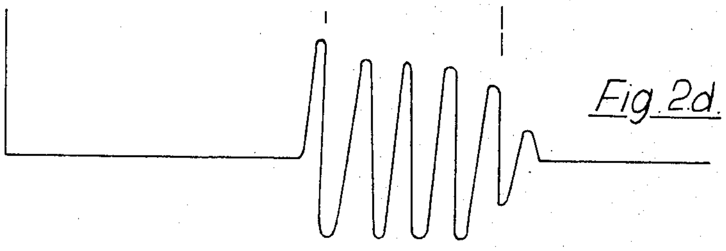
FIG. 2*d* depicts the oscillator output waveform.

While the monostable is in its stable state the Q output is at + 5V and hence supplies base current to transistors VT5 and VT7 via resistors R16 and R17 respectively. These transistors are therefore saturated so that the input to the oscillator is effectively short-circuited by transistor VT7 while transistor VT6 is held off by transistor VT5. When the monostable is driven into its quasi-stable state VT5 and VT7 are turned off and VT6 is turned on, the effective short-circuit is removed from across the oscillator input and power is applied to it via the current limiter 31. The oscillator requires a high starting current which is provided by C7, and the resulting oscillator output waveform is depicted in FIG. 2*d*.

It is to be understood that the foregoing description of specific examples of this invention is made by way of example only and is not to be considered as a limitation on its scope.

What is claimed is:

1. A low light level television system comprising a television camera tube including means for providing a vertical blanking pulse, an image intensifier tube coupled to said camera tube to provide an intensified optical input thereto, a rectifying voltage multiplier connected to said image intensifier to apply direct voltage thereto, an oscillator applying an alternating voltage to said voltage multiplier, a pulsed power supply circuit connected to said oscillator for turning said oscillator on and off, and a timing circuit providing a trigger pulse to said pulsed power supply circuit in advance of the pulse edge of said vertical blanking pulse to cause said vertical blanking pulse to occur during the conduction period of said oscillator.

2. The system of claim 1 wherein said trigger pulse is at the television camera frame frequency, said timing circuit includes a cascade of monostable dividing circuits including an output circuit providing a quasi-stable condition for said trigger pulse including a first pulse edge for triggering the start of said vertical blanking pulse, the reversion of said output circuit into its stable condition providing a second pulse edge for triggering the start of said pulsed power supply circuit for said oscillator.

3. The system of claim 2 wherein said pulses power supply circuit includes means for short-circuiting said oscillator to turn said oscillator off.

4. The system of claim 2 including a current limiter applying a controlled direct current to said oscillator.

* * * * *